2,992,424
AUTOMATIC TRACKING SYSTEM

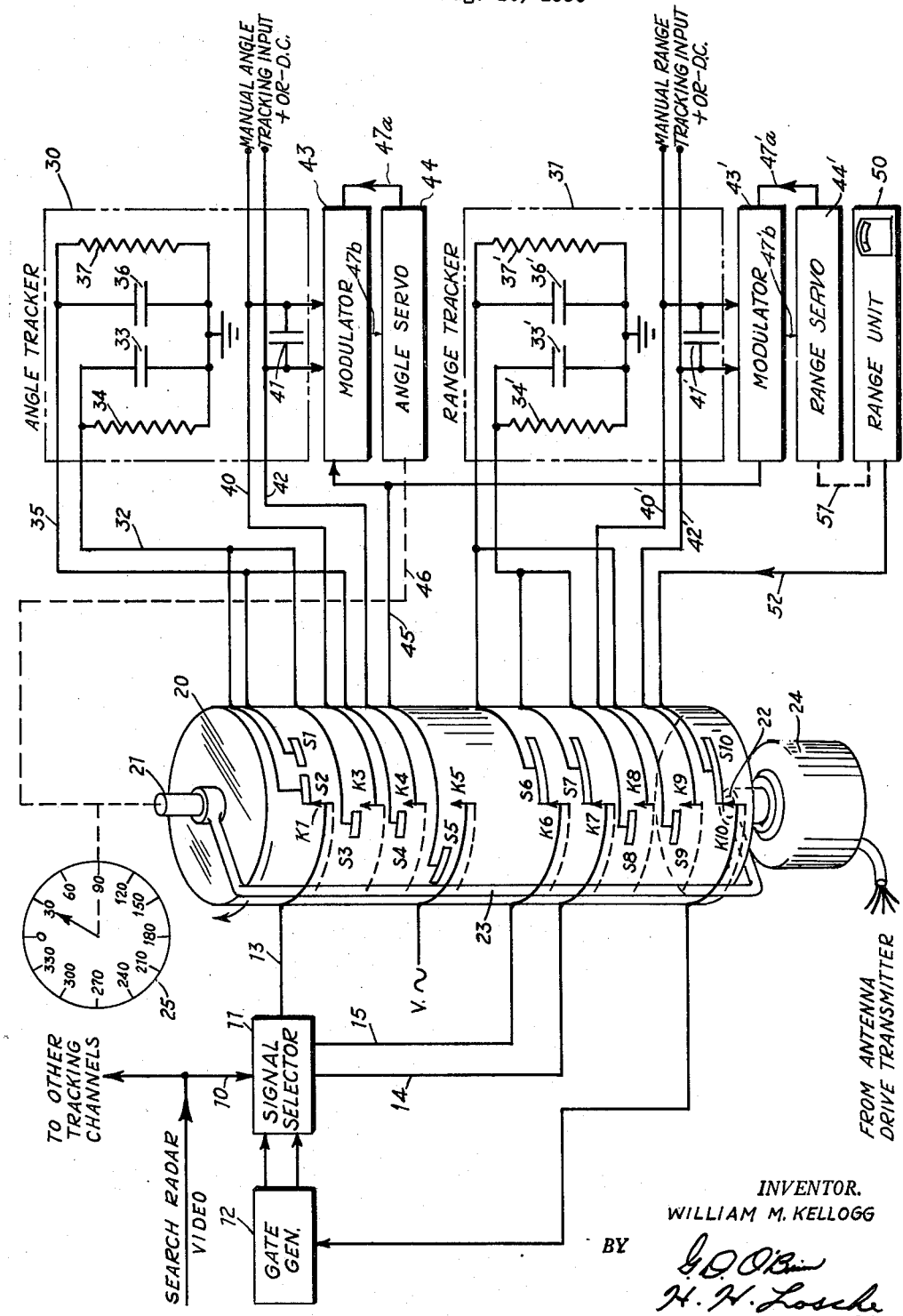

William M. Kellogg, Morristown, N.J., assignor, by mesne assignments, to the United States of America as represented by the Secretary of the Navy
Filed Aug. 16, 1956, Ser. No. 604,578
6 Claims. (Cl. 343—7.3)

This invention relates to search radar automatic tracking systems, and more particularly to a system for automatically tracking a target object in azimuth, range, and elevation utilizing search radar video signals.

It is the generally accepted practice of tracking target objects by assigning personnel, one person to each target objective, for plotting the target direction, elevation, range, et cetera, on a plotting board and/or chart from information received, as by instrumentation. Such tracking of target objectives requires considerable personnel and is subject to the natural human error. Manual plotting and tracking of targets also require considerable time, which are disadvantages with the coming of higher speeds of target vehicles.

In the present invention a singel operator may channel each target, as it appears, to automatic target tracking devices, which automatic target tracking devices require a minimum of personal attention. Only automatic target tracking will be considered in this invention since the detection of the target and its acquisition by the tracker will be assumed to be under the control of the operator who channels the target objectives to the tracking devices. The system employs prediction and assumes that the target flight characteristics are within the trackable deviation field of the tracker or, in other words, that at each scan the tracker can sense the amount and direction of the deviation of its tracking gates with respect to the target position. In this invention a novel combination of an electrical switching means and an electrical storage means for switching and storing target position information is used in predicting target travel. The electrical switching means may take the form of either a rotatable drum or disc, with electrical contact segments angularly disposed thereabout and a concentric rotatable support or disc supporting companion contact brush elements, to pass gated search radar video signals to the electrical storage means in which storage means the signals may be compared and the error signals stored for use in driving servo-mechanisms operative to cause predicted target travel. In this manner, once the search radar video signals of a target objective are gated and introduced to the tracking means, the target is thereafter automatically tracked with a minimum of assistance from any tracking personnel. It is, therefore, a general object of this invention to provide automatic target tracking means for tracking a plurality of target objectives in azimuth, range, and elevation from search radar video signals.

These and other objects, advantages, features, and uses may become more apparent as the description proceeds in conjunction with the accompanying drawing which illustrates the invention, partly in block diagram, partly in functional circuits, and partly in mechanical schematics.

Referring more now to the figure of drawing, the video signal from a search radar (not shown) in a target tracking system is introduced by way of the conductor 10 to a signal selector 11. Gating circuits (not shown) within the signal selector 11 are controlled by a gate generator 12 coupled thereto, as is well understood by those skilled in the art. The signal selector 11 also has pulse stretching means (not shown) of any suitable type, as is well understood in the art, which accepts the search radar video echo signal of a target and stretches this echo pulse for the output of the signal selector 11 on the conductor 13 for use and for the purpose soon to be described. The gating circuits within the signal selector 11 also receive the transmitted and echo video signals of a target and transmit the near and far halves of the gated signals for transmission over the conductors 14 and 15 for the use and purpose soon to be described. The search radar video signals may be transmitted to other tracking channels, as shown in the drawing.

While many forms of an electrical switching means may be used herein for the purpose of illustrating the invention, the electrical switching means is shown as a rotatable drum 20 journaled by shaft extensions 21 and 22 in any suitable manner. The outer surface of this drum insulatingly carries a plurality of electrically conductive segments angularly and longitudinally spaced therearound to provide a specific switching arrangement. As shown, electrically conductive segments S1 through S10 are specifically positioned in relation to contact brushes K1 through K10. The contact brushes K1 through K10 are held in a fixed position on a bracket 23 which bracket is journaled on the shaft extensions 21 and 22 and driven by a synchro-receiver 24 coupled to a synchro-transmitter (not shown) on the radar antenna to rotate the contact brushes around the periphery of the drum 20 in alignment with the radar beam to cooperate with companion contact segments in a specifically prescribed manner herein set forth below. The bracket 23 is illustrated herein as one means of supporting the contact brushes although other means may be used, as desired. For example, an arrangement of a pair of relatively rotatable discs, one supporting the contact segments and the other supporting the contact brushes, may be used as may be readily understood by a mechanic skilled in the art of switching. K1 cooperates with companion conductive segments S1 and S2, K3 cooperates with companion segment S3, K4 cooperates with companion segment S4, K5 cooperates with companion segment S5, K6 cooperates with companion segment S6, K7 cooperates with companion segment S7, K8 cooperates with companion segment S8, K9 cooperates with companion segment S9, and K10 cooperates with companion segment S10. The drum 20 and bracket 23, with the identified contact brushes and segments set forth herein, are only sufficient to provide angle tracking and range tracking, it being understood that additional contact brushes and conductive segments may be placed and utilized on this drum and bracket for additional tracking information as, for example, elevation tracking. The drum 20 is illustrated herein for the purpose of this invention as being driven through the use of shaft means 46 in a manner which will become clear as the description proceeds. A directional indicator 25 may be directly driven by any suitable mechanical coupling to drive the indicator 25 in direct correspondance to the angular rotation of the drum 20. The indicator 25 may have the azimuth direction in degrees as indicia thereon.

As may now appear clear from the drawing, the contacts K1 through K5 and companion conductor segments S1 through S5 on the upper end of the drum 20 are used for switching angle tracking information, while the contact brushes K5 through K10 and conductor segments S5 through S10 are utilized for switching range tracking information. The contact brushes and segments in the upper half of the drum 10 are coupled to an angle tracker network 30, while the contact brushes and contact segments on the lower half of the drum are coupled to a range tracker network 31. S2 and S3 are coupled by a conductor 32 to a storage capacitor 33 and resistor 34 in parallel to ground. S1 and S4 are coupled by the conductor 35 to a storage capacitor 36 and a resistor 37 in parallel to ground. The conductor 13 from the signal selector 11 is connected to the contact brush K1. The capacitors 33 and 36 have equal capacity and the capacitor 41 must be larger than 33 and 36. The resistors 34 and 37 are of high impedance to discharge the associated capacitor during interscan intervals. The contact brush K3 is connected by a conductor 40 to the right hand plate of the storage capacitor 41 in the angle tracker network, and the contact brush K4 is connected by the conductor 42 to the left hand plate of the storage capacitor 41. The conductors 40 and 42 extend externally of the angle tracker network so that a positive or negative D.-C. voltage may be applied to the storage capacitor 41 manually, as will hereinafter be more fully described and made clear. The opposite plates of the storage capacitor 41 are coupled to a modulator 43 which is coupled to an angle servo-motor 44 by conductor 47b and by alternating current supplied over conductor 45 through the switch S5, K5 on the drum 20 from an alternating current voltage source. The angle servo-motor 44 mechanically drives the drum 20 in any suitable manner, as illustrated herein by shaft means 46. Position feedback by way of 47a from the angle servo-motor 44 to the modulator 43 is such that the increment of angular motion of the drum 20 corresponds in magnitude and direction to the value and polarity of the voltage across capacitor 41.

The range tracking network is identical to the angle tracker network and, where shown, for convenience and clarity, like parts are given like reference characters primed. In the range tracker portion of this system the contact brushes K6 and K7 are connected to the conductors 15 and 14, respectively, the conductor segments S6 and S9 are coupled to the storage capacitor 36′, and the conductor segments S7 and S8 are coupled to the storage capacitor 33′. The only variation from the angle tracker portion of this system is that the conductor segments S6 and S7 cooperate simultaneously with the contact brushes K6 and K7, whereas the contact K1 cooperates consecutively with the conductor segments S1 and S2. This switching arrangement is possible since the signals from the signal selector 11 already carry the sense and magnitude of the tracker deviation in range. The contact brushes K6 and K7 and companion segments S6 and S7 are required only to serve as angle gates in the range tracking portion of the system and to pass the error signals to the storage capacitors 33′ and 36′ during the angular interval of target illumination. A modulator 43′ is coupled to receive the error signal from the storage capacitor 41′ in the range tracker network to drive a range servo-motor 44′ with alternating current supplied to the modulator 43′ by way of conductor 45 in the same manner as explained for the angle tracker network 30. The contact brushes K8 and K9 are coupled to the opposite plates of the storage capacitor 41′ to store the voltages present on the storage capacitors 33′ and 36′ in the same manner as that for the angle tracker network 30. In the range tracker portion of this system the range servo-motor 44′ mechanically drives a range unit 50 through any suitable mechanical coupling, as illustrated by the dotted line 51, which range unit indicates the range of a target illuminated by the search radar. Information from the range unit 50 is fed back by the conductor means 52 through the switch K10, S10 on the drum 20 to the gate generator 12 to control this gate generator in generating the gate signals for the gate circuits (not shown) in the signal selector 11.

An elevation tracker could well be included by any mechanic skilled in the art by the use of another set of contact brushes and contact segments on the drum 20 and bracket 23 in cooperation with an elevation tracking storage network to drive an elevation indicator unit in the same manner as shown for the angle tracking and range tracking in this system. Since the multiplication of tracking information is obvious in view of the angle tracking and range tracking disclosed herein, it is considered unnecessary to illustrate more than the two tracking portions of this automatic tracking system as set forth by the description and drawing.

In the operation of this automatic tracking device the bracket 23 is rotating in alignment with the search radar beam. The echo video signal from the search radar coming by way of the conductor 10 is selected and expanded in the signal selector 11 and passed to the contact brush K1. The echo video signal is expanded to occupy most of the interpulse interval of the contacting of brush K1 with the segments S1 and S2 but no greater than the time interval so that the signal energy for angle tracking will be as great as possible. As the contact brush K1 passes over S1 and S2 the capacitors 36 and 33, respectively, will be charged. If the search radar is sweeping over the target at the same time that K1 is passing over S1, S2, the capacitors 36 and 33 will be charged equally since the capacitors 36 and 33 are of equal capacity. As the contact brush K1 passes off the segment S2, contact brushes K3 and K4 simultaneously contact the segments S3 and S4, respectively, to conduct the charges on the storage capacitors 33 and 36, respectively, to the opposite plates of the storage capacitor 41. These charges being equal, the storage capacitor 41 will store no charge whatsoever whereupon the angle servo-motor will not deviate from its present position leaving the drum 20 in its present position in this interscan interval of the search radar. The target should then be in azimuth as registered on the indicator 25. This situation may happen when the target objective is going on a radial line directly to or from the search radar. If the object target is actually leading the angle tracker, the charge on the storage capacitor 36 will exceed the charge on the storage capacitor 33 since the expanded video signal coming by way of conductor 13 to the contact brush K1 to the contacts S1 and S2 and through the conductors 32 and 35 will be cut off before the contact of K1 and S2 is completed. Consequently, when K3 and K4 are in contact with S3 and S4, respectively, the difference in charge between the storage capacitors 36 and 33 will be stored as a D.-C. error voltage on the storage capacitor 41. This stored D.-C. error voltage modulates the alternating current coming by way of the conductor 45 upon contact of K5 with S5 to step or advance the angle servo-motor 44 in an amount predicted by the error voltage stored on the storage capacitor 41 to advance the drum 20 and, consequently, the indicator 25 to register the actual angle of the target objective. This angle servo-motor operation does not take place until after the storage on the storage capacitor 41 is complete, as may be seen in the drawing where K5 does not contact S5 until after the disconnection of K3 and K4 from S3 and S4, respectively. The storage on the storage capacitor 41, therefore, causes the drum 20 to advance a predicted amount during the interscan interval, which predicted amount should bring the azimuthal registration in direct correspondence with the azimuthal coordinate of the target objective. The feedback 47a of the angle servo-motor 44 to the modulator cancels out the error upon the accomplishment of advancing the drum to the predicted azimuth position of the objective target. Where the drum 20, and consequently the registration on the meter 25, is in advance of the target, the storage capacitor 33 will receive a greater charge than the storage capacitor 36 which will cause an error voltage to appear in reverse polarity on the storage capacitor 41 to produce a reverse step in the motivation of the angle servo-motor 44 rotating the drum 20.

The operation of the range tracker portion of the system is substantially identical, except that no pulse stretching can be used, to that of the angle tracker portion, one difference being that the near and far portions of the gated range pulses from the signal selector 11 are impressed on the storage capacitors 36' and 33' simultaneously through the switches K6, S6 and K7, S7. Another deviation from the operation as given for the angle tracker is that the range servo-motor 44' drives the range unit 50 directly for indicating the range, which range unit feeds back an electrical value through the switch K10, S10 at the same time that the far and near pulse values are fed to the capacitors 36 and 33 to the gate generator 12 to cause correction of the gate generator for changes in range of the objective target to produce a change in the gating of the search radar video transmitted and echo pulses.

It may be seen from the above description that the tracking of the target in azimuth and in range is by increments during the interscan interval produced when the alternating voltage source is placed in circuit through the contact brush and conductor segment K5, S5. As an alternative to tracking by position increments, the tracker could be designed to advance on a rate basis. In this case the modulator would be continuously enabled by the alternating current input, and the feedback arrangements of the servo-motors would be such that the angular rate of the angle tracking drum 20 would correspond to the charge on the capacitor 41. Thus, by proper relationship between the speed of the drum and the charge on the capacitor 41, the proper tracking motion could be accomplished during the interscan interval. This rate method of tracking would permit motion of the tracker to continue during the short intervals of target illumination by the radar. Since this motion would be small as compared with the tracking action accomplished between scans, it would be negligible in its effect upon target position data. Since the alternate method of rate tracking would be obvious to one skilled in the art, its specific embodiment shown in the drawing by merely eliminating the switch K5, S5 on the drum 20 is considered unnecessary herein.

It is sometimes advantageous, and particularly in initiating tracking action, to apply a direct current voltage of the desired polarity to the storage capacitor 41 or 41' by any suitable manual means, which voltage may be applied over the conductors 40 and 42 or 40' and 42'. Once the tracker is brought in near coincidence to the azimuth direction of the target and range of the target it will operate to continuously track the target thereafter.

While many modifications and changes may be made in the constructional details or features of this invention, it is understood that I desire to be limited only by the scope of the appended claims.

What is claimed is:

1. Means for storing a periodically recurring signal comprising, a rotary switching device having two rotatably movable concentrically disposed elements, motor means for continuously rotating the first of said elements, follow-up means for rotating a second of said elements relative to the first, a pair of circumferentially spaced contacts on one of said elements, an aligned contact on the other of said elements for making electrical connection successively with each of said pair of contacts when said elements rotate with respect to one another, a pair of electrical storage circuits permanently respectively connected to each of said pair of contacts, wiring means connecting the signal to said aligned contact, a third storage means, means connecting said third storage means between said pair of storage means only after the engagement of said aligned contact with said pair of contacts, and means coupling said third storage means to the input of the follow-up system rotating the second of said elements.

2. An apparatus for storing angular information obtained from rotating angular detection means and comprising, an input for receiving a signal from said rotating angular detection means, a motor rotating in synchronism with said angular detection means, a two element rotary switching device having one of its elements rotated by said motor, a follow-up system connected to position said second element in response to a voltage input, first and second circumferentially spaced contacts on one of said elements, a third aligned contact on the other of said elements which successively engages said first and second mentioned contacts as said elements rotate relative to one another, storage capacitors connected to each of said first and second elements, means coupling the input signal to the third mentioned contact, and means applying the differential voltage between said capacitors to said follow-up system as the voltage input thereof.

3. A search radar automatic tracking device comprising, an input terminal for receiving target signals from a PPI type radar, a rotary switch comprising a rotatable drum having first and second circumferentially spaced contacts thereon and a bracket rotatable concentrically around said drum supporting a third contact aligned with said first and second contacts for sequential connection therewith during relative rotation of the two parts of said switch, first and second storage means coupled to said first and second contacts on said drum, means coupling the input signal from said terminal to said contact on said bracket, a synchro motor for continuously rotating said bracket to the indicated direction from which said radar is receiving signals, and servomechanism means mechanically coupled to said drum which receives as an input the differential signal between said two storage means for positioning said drum in accordance therewith.

4. The apparatus of claim 3 additionally including third and fourth contacts on said drum each equal in circumferential length to the distance between the extremities of said first and second contacts on said drum, second and third contacts on said bracket positioned to make connection with the third and fourth contacts on said drum coincident with the time taken for said first contact on said bracket to relatively traverse the extremities of said first and second contacts on said drum, third and fourth storage means connected respectively to said third and fourth contacts on said drum, a range gate interposed between said input terminal and said first contact on said bracket and also between said input terminal and said second and third contacts on said bracket, and feedback means operable in response to the differential signal between said third and fourth storage means to energize said range gate.

5. The apparatus of claim 3 further including fifth and sixth aligned contacts on said drum, said fifth and sixth contacts on said drum being connected to said first and second contacts on said drum but displaced relative thereto in the circumferential direction of the rotation of said bracket, fourth and fifth contacts on said bracket for engaging said fifth and sixth contacts on said drum respectively as said bracket rotates but after the connection of said first contact on said bracket with said first and second contacts on said drum, and a storage capacitor the terminals of which are connected to the fourth and fifth contacts on said bracket, said capacitor constituting means to provide an input signal to the servomechanism which positions said drum.

6. Apparatus for indicating and storing angular input information in accordance with an angular input signal comprising, first, second, third and fourth switches wherein said first and second switches are operated successively after which said third and fourth switches are operated simultaneously, means for coupling the input signal to a contact of both said first and second switches, a pair of storage means connected to the remaining contacts of said first and second switches, means coupling said first and second storage means to contacts respectively of said third and fourth switches, a third storage means connected across the remaining contacts of said third and fourth switches, and servomechanism means operable in accordance with the signal across said third storage means to alter as a unit the time at which all said switches operate in accordance with the signal on said third storage means.

References Cited in the file of this patent

UNITED STATES PATENTS

| | | |
|---|---|---|
| 2,422,068 | Bedford | June 10, 1947 |
| 2,688,743 | Berger et al. | Sept. 7, 1954 |
| 2,751,439 | Burton | June 19, 1956 |